(12) United States Patent
Schmid et al.

(10) Patent No.: US 12,107,478 B2
(45) Date of Patent: Oct. 1, 2024

(54) ELECTRIC MOTOR WITH DEEP DRAWN MOTOR HOUSING

(71) Applicant: NIDEC Motors & Actuators (Germany) GmbH, Bietigheim-Bissingen (DE)

(72) Inventors: Jürgen Schmid, Brackenheim (DE); Thomas Kübler, Untergruppenbach (DE); Matthias Fischer, Besigheim (DE)

(73) Assignee: NIDEC MOTORS & ACTUATORS (GERMANY) GMBH, Bietigheim-Bissingen (DE)

( * ) Notice: Subject to any disclaimer, the term of this patent is extended or adjusted under 35 U.S.C. 154(b) by 375 days.

(21) Appl. No.: 17/591,211

(22) Filed: Feb. 2, 2022

(65) Prior Publication Data

US 2022/0247264 A1  Aug. 4, 2022

(30) Foreign Application Priority Data

Feb. 3, 2021 (DE) .......................... 102021102500.1

(51) Int. Cl.
*H02K 5/22* (2006.01)
*H02K 15/14* (2006.01)

(52) U.S. Cl.
CPC .............. *H02K 5/22* (2013.01); *H02K 15/14* (2013.01)

(58) Field of Classification Search
CPC . H02K 5/22; H02K 5/24; H02K 11/33; H02K 5/04

USPC .................................. 310/89, 400, 402, 405
See application file for complete search history.

(56) References Cited

U.S. PATENT DOCUMENTS

| | | | | |
|---|---|---|---|---|
| 2002/0148269 A1* | 10/2002 | Ruck | ................... | H01M 8/0263 72/197 |
| 2004/0032177 A1* | 2/2004 | Nitzsche | .................. | H02K 5/24 310/91 |
| 2015/0236552 A1 | 8/2015 | Lauk et al. | | |

FOREIGN PATENT DOCUMENTS

| | | | | |
|---|---|---|---|---|
| DE | 10 2013 201 715 A1 | 3/2014 | | |
| DE | 10 2015 226 720 A1 | 1/2017 | | |
| DE | 10 2018 204 839 A1 | 10/2019 | | |
| WO | WO-2020096191 A1 * | 5/2020 | ............. | H02K 21/16 |
| WO | 2020/251146 A1 | 12/2020 | | |
| WO | WO-2022122087 A1 * | 6/2022 | ............. | B60T 13/74 |

* cited by examiner

*Primary Examiner* — Jose A Gonzalez Quinones
(74) *Attorney, Agent, or Firm* — Keating & Bennett, LLP

(57) ABSTRACT

An electric motor includes a deep-drawn motor housing including a base and an opening opposite the base, the opening being adjoined by a flange. The flange includes, adjoining the opening, at least one partial formation introduced in an axial direction and including a bearing surface of a component of the electric motor. The bearing surface is arranged in its axial position in the axial direction with respect to a surface in the bottom of the motor housing in the deep-drawing process, and the bearing surface is arranged in its radial position in a radial direction by the opening as a reference surface.

14 Claims, 5 Drawing Sheets

ELECTRIC MOTOR WITH DEEP DRAWN MOTOR HOUSING

CROSS REFERENCE TO RELATED APPLICATION

The present application claims priority under 35 U.S.C. § 119 to German Application No. 10 2021 102 500.1, filed on Feb. 3, 2021, the entire contents of which are hereby incorporated herein by reference.

FIELD OF THE INVENTION

The present disclosure relates to an electric motor.

BACKGROUND

Electric motors, which are referred to as internal rotor motors, have a rotor that contains a motor shaft and is rotatably mounted in a housing. The rotor is provided with permanent magnets. A stator is arranged around the motor, which carries a number of windings on an iron core. When suitably controlled, the windings generate a magnetic field that drives the rotor to rotate. The windings are usually of a three-phase design and are accordingly provided with three electrical connections via which the windings can be connected to a control unit (ECU). The winding ends are contacted via busbars, which may be encapsulated in a busbar assembly.

In electric motors, the assemblies (stator and rotor) must be axially aligned to achieve the boundary parameters required during operation. If the electric motor has a deep-drawn motor housing, the axial alignment is often specified by shoulders or projections on the inner geometry of the motor housing to facilitate assembly operations. Radial cutting and/or embossing operations required for this purpose or the formation of a circumferential shoulder are undesirable, as they are associated with a number of disadvantages. Radial embossing results in restrictions on the achievable planarity, which depends among other things on the thickness of the engine housing wall, the tightness of the engine housing and has an influence on the geometry of the housing around the embossing point. In addition, the manufacturing tolerances due to the radial stamping process are relatively high and a necessary reference plane is often not functional. When a circumferential shoulder is provided, it is disadvantageous that the installation space of the housing is increased and an annular surface is created which exceeds the requirements.

SUMMARY

Example embodiments of the present disclosure provide electric motors each including a motor housing which is simple to manufacture and which permits accurate axial alignment of the assemblies.

For the purpose of geometrical description of the electric motor, with respect to the longitudinal axis of a motor housing, the following description refers to a radial direction, which indicates the distance from the longitudinal axis, and also refers to a circumferential direction, which is defined tangentially to a certain radius arranged in the radial direction. The direction of the longitudinal axis is also called the axial direction.

An example embodiment of an electric motor includes a deep-drawn motor housing including a bottom and an opening opposite the bottom, the opening adjoining a flange which includes, adjoining the opening, at least one partial formation introduced in the axial direction with a bearing surface to support a component of the electric motor. In the axial direction, the bearing surface is calibrated in its axial position relative to a surface defined in the bottom of the motor housing in the deep-drawing process. A position of the supporting surface is located in the radial direction by the opening as a reference surface. The at least one support surface can be located in its position with a simple fabrication so that a motor component resting on it is aligned accordingly, which simplifies the assembly process of the electric motor. Radial deformation of the deep-drawn motor housing or a circumferential shoulder can thus be avoided.

Preferably, the at least one partial formation is done by stamping the flange.

Preferably, the position of the bearing surface is calibrated by an embossing process.

Preferably, the surface in the bottom of the motor housing is a bearing support surface of a rotor bearing that is functional.

In an example embodiment of the present invention, an electric motor component is a busbar assembly. The position of the busbar assembly is thus clearly defined and additional mounting options do not have to be created in the motor housing.

The flange may be polygonal or substantially polygonal in cross-section, with flange corners including a screw-on point, and each of the flange corners includes two formations, each of which includes a bearing surface and each of which defines a bending edge of the motor housing between the screw-on point and the opening. The sections shift the bending edge away from the opening towards the screw-on points, so that the flange is significantly more mechanically stable.

If there are several contact surfaces, these preferably lie plane-parallel in a common plane.

Preferably, each formation takes the shape of a right triangle in cross-section, with a side opposite the right angle being defined by the opening of the motor housing and the other two sides extending parallel or substantially parallel to the outer sides of the flange. Preferably, the two formations of a flange corner are spaced apart and have mirror symmetry with respect to an axis of symmetry passing through the bolt-on point and the longitudinal axis of the engine housing. Thereby, preferably, a rectangular or substantially rectangular envelope of the two formations of a flange corner encloses the corresponding screw-on point, wherein the screw-on point is in a radially outermost corner of the envelopes. Preferably, the outer sides of the flange in the area of the screw-on point as well as the sides of the projections close to the screw-on point enclose with their extensions an imaginary square in the center of which the screw-on point is provided. It is advantageous if the imaginary square defines a flat area whose size is adapted to the diameter of a fastener provided for the screw-on point. Preferably, the imaginary square defines a flat area whose size is adapted to the diameter of a fastener provided for the screw-on point.

Preferably, the contact surfaces adjoining the opening are approximately semicircular in shape. The busbar assembly can include corresponding bulges which rest on the contact surfaces lying outside the cylinder geometry.

Preferably, the electric motor is an internal rotor motor whose rotor is provided with magnets and which is surrounded by a stator carrying a number of windings on an iron core, the winding ends being electrically contacted via the busbar assembly.

An example embodiment of the present invention provides a method of processing a deep-drawn motor housing of an electric motor, wherein the deep-drawn portion of the motor housing includes a bottom and an opening opposite the bottom and adjoined by a flange. The method includes forming the flange in the axial direction in at least one region adjoining the opening to form at least one partial formation. The method further includes, in the region of the at least one formation, forming a bearing surface. During the forming of the axial position of the bearing surface relative to a surface formed in the bottom of the motor housing in the deep drawing process and the radial position of the bearing surface relative to the opening are calibrated.

The above-mentioned advantages result. Preferably, the method uses an embossing process. Depending on the degree of deformation, the bearing surface(s) can be produced in one or more forming steps. The forming process includes a final calibration process that ensures the appropriate accuracy of the reference surfaces in an embossing process.

The motor housing can be structured as described above. It is preferably part of an internal rotor motor. The calibration surface is preferably the bearing support surface of a rotor bearing. The bearing surfaces are preferably provided to support a busbar assembly.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the present disclosure is explained in more detail below with reference to the drawings. Similar or similarly acting components are designated in the figures with the same reference signs.

DETAILED DESCRIPTION

Figure 1:
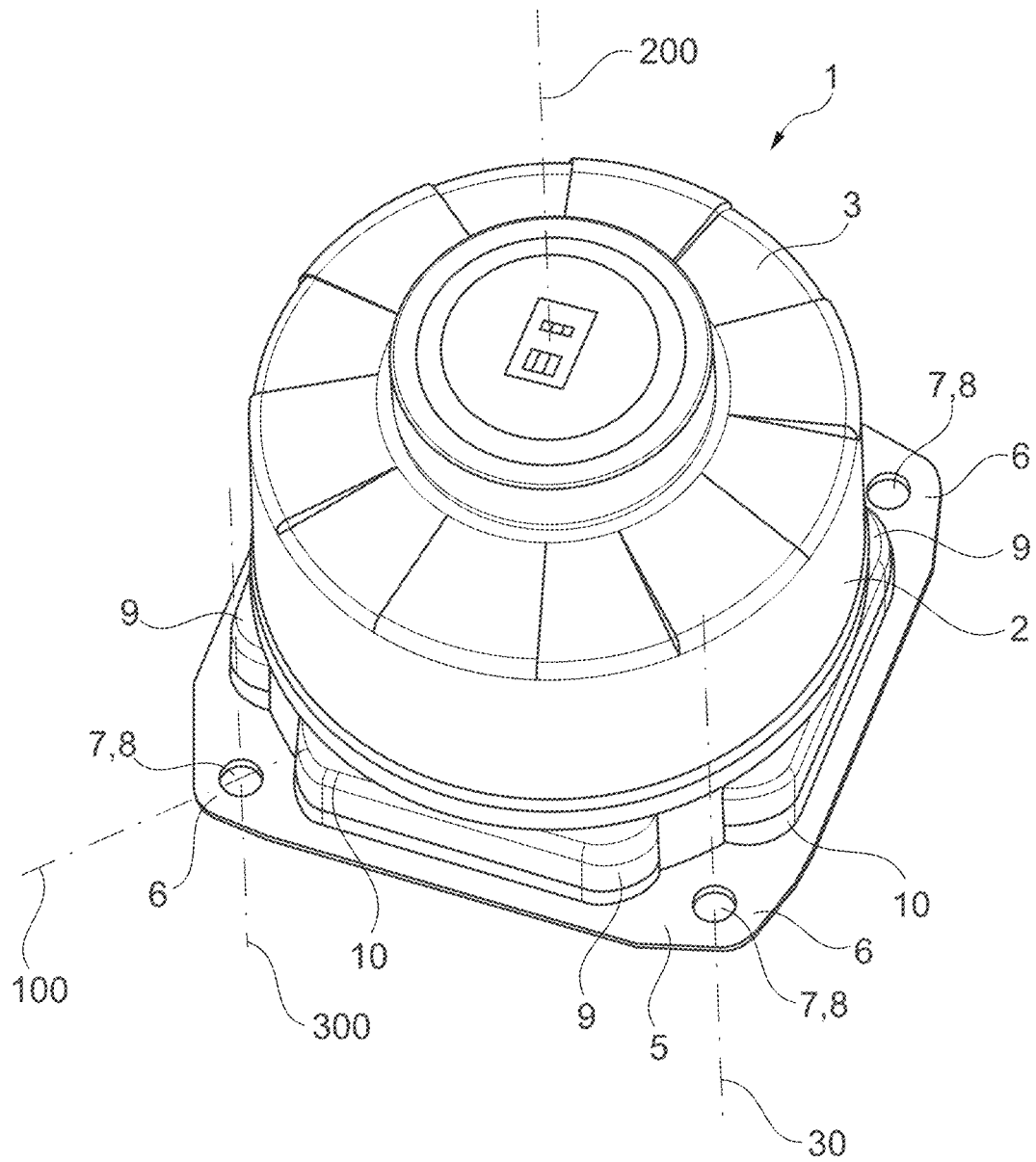
FIG. 1 shows a spatial view from below of a motor housing of an electric motor according to an example embodiment of the present invention.

FIG. 1 shows a deep-drawn motor housing 1 of an electric motor. The motor housing 1 is a pot-shaped body with a substantially cylindrical outer surface 2, a bottom 3 and an opening opposite the bottom 3. The opening is circumferentially surrounded by a flange 5. The flange 5 has a substantially rectangular base with four flange corners 6, only three of which are shown in the figure. In each of these flange corners 6, which are evenly distributed in the circumferential direction, an interspersing bore 7 is provided as a screw-on point 8. In the area of the flange corners 6, the flange 5 also has embossments 9, 10 extending downwards in the direction of the base 3. Two formations 9, 10 are associated with each flange corner 6, which in the case shown are embossments and which are arranged in mirror symmetry with respect to an axis of symmetry 100 which connects the central axis or longitudinal axis of the engine housing 200 and the central axis of the corresponding screw-on point 300 perpendicular thereto. The two embossments 9, 10 of a flange corner are circumferentially spaced apart.

Figure 2:
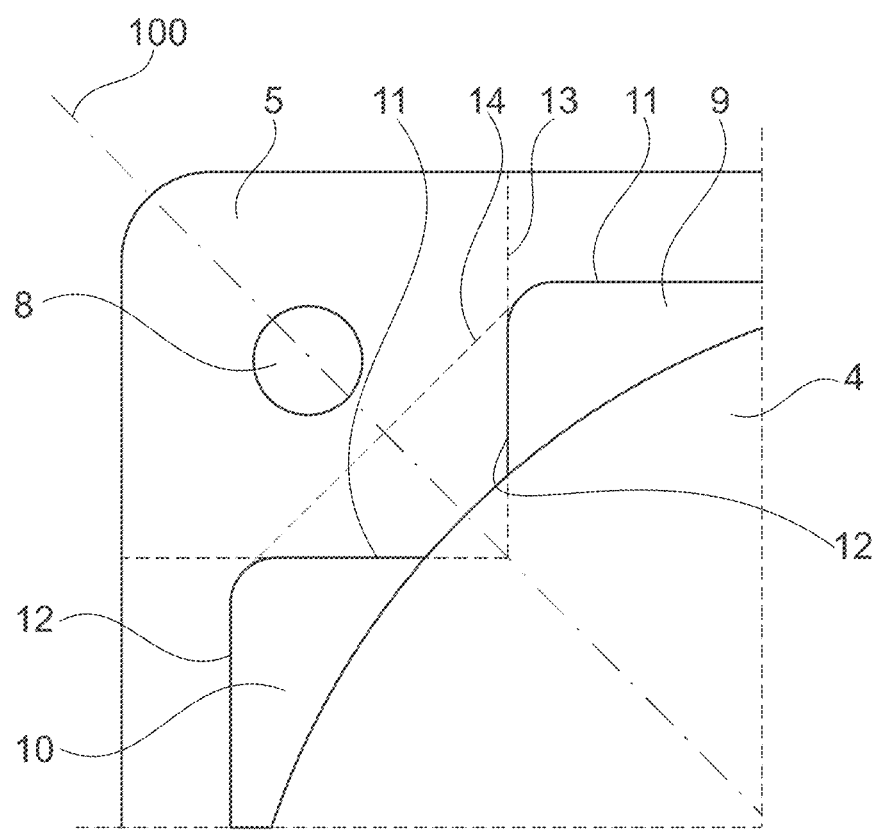
FIG. 2 shows a schematic representation of a corner of the motor housing of FIG. 1 in plan view from above.

As can be seen in detail in FIG. 2, a respective embossment 9, 10 has in cross-section two limiting sides 11, 12 which enclose a right angle. The two sides 11, 12 extend parallel to the outer sides of the flange 5. The embossments 9, 10 join the opening 4 inwardly in the radial direction. Each embossment 9, 10 takes approximately the shape of a triangle in cross-section, with the side opposite the right angle formed by the opening 4 of the motor housing. A rectangular envelope of the two embossments 9, 10 of a flange corner encloses the corresponding screw-on point 8, the screw-on point 8 being arranged lying in the radially outermost corner of the envelopes. The outer sides of the flange in the area of the screw-on point and the sides of the embossments close to the screw-on point form with their extensions an imaginary square 13, in the center of which the screw-on point is arranged. The otherwise usual cylindrical geometry at the screw-on points is eliminated. The imaginary square 13 defines a flat area, the size of which is adapted to the diameter of the screw head that engages the through hole or its washer, the area being connected as far as possible directly to the opening of the engine housing.

A direct connection of the right angles of the embossments of a flange corner 14 is aligned parallel to a tangent of the opening 3 at the level of the symmetry axis 100 and lies in the radial direction between the screw-on point 8 and the opening 3.

Figure 3:
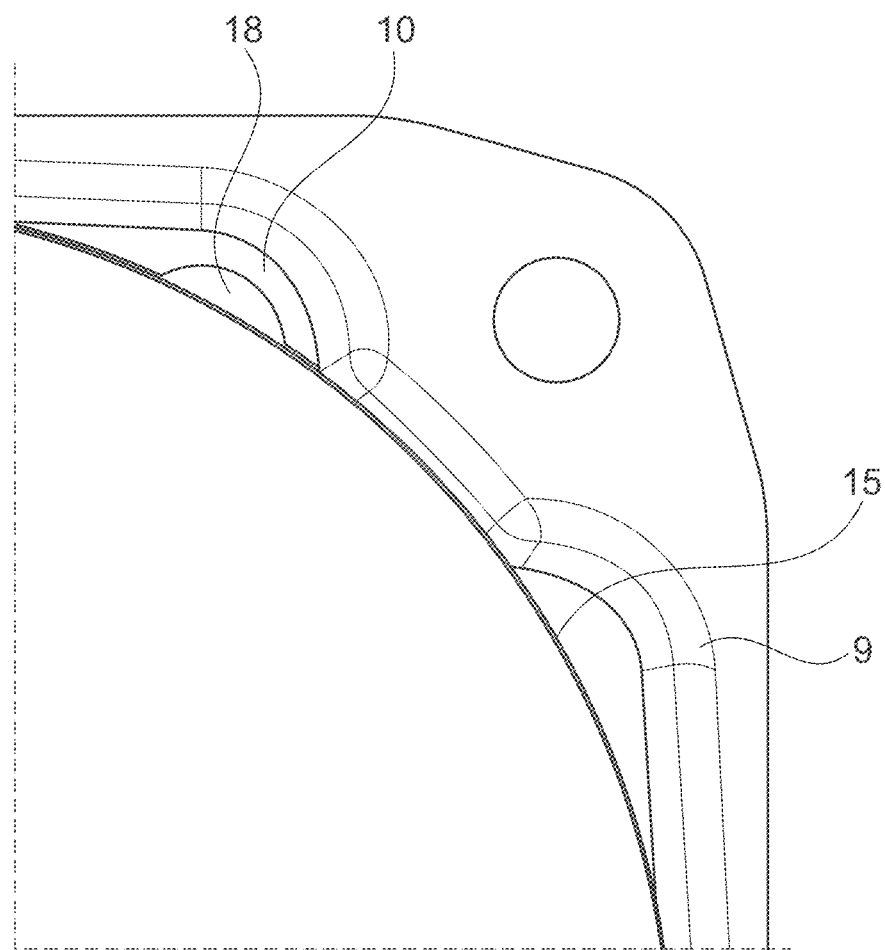
FIG. 3 shows a perspective view from above of a corner area of the motor housing of FIG. 1 with the busbar assembly inserted into the motor housing.

As shown in FIG. 3, the embossments 9, 10 serve as axial support surfaces for a busbar assembly 15 of the electric motor. Support surfaces 16 are formed in the embossments 9, 10 by an additional forming process (see FIG. 4). Preferably, the forming process is a stamping process. The bearing surfaces 16 are flat and lie in a common plane. Depending on the degree of deformation, the bearing surfaces 16 can be produced in one or more deformation stages. The forming process includes a final calibration process that ensures the appropriate accuracy of the reference surfaces.

Figure 5:
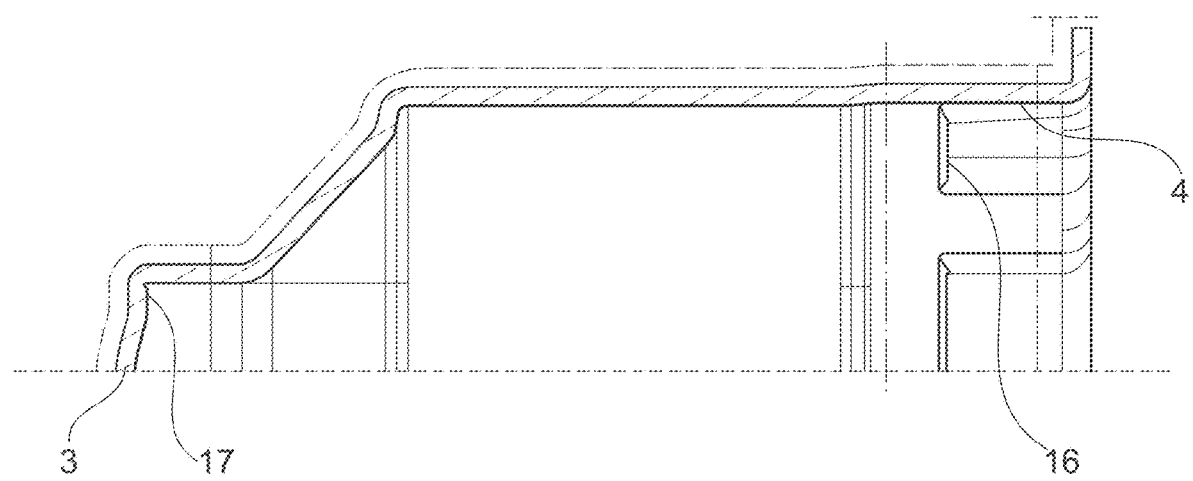
FIG. 5 shows a longitudinal section through one half of the motor housing.

The bearing surfaces 16 are calibrated together with a further, functionally important surface by a suitable process design, i.e. the bearing surfaces 16 are re-stamped in a calibration process. As can be seen from FIG. 5, the important functional surface is preferably the axial bearing support surface 17 for a bearing which supports a rotor shaft of the electric motor at the end remote from the opening. This bearing is also called a B bearing. This axial bearing support surface 17 is arranged in the base of the motor housing 3 and is formed in the deep-drawing process. The axial position of the support surfaces for the busbar assembly 16 is thus defined by the distance a to the bearing support surface 17. In the radial direction, the reference surface is the opening of the motor housing 4, also called the flange bore.

Figure 4:
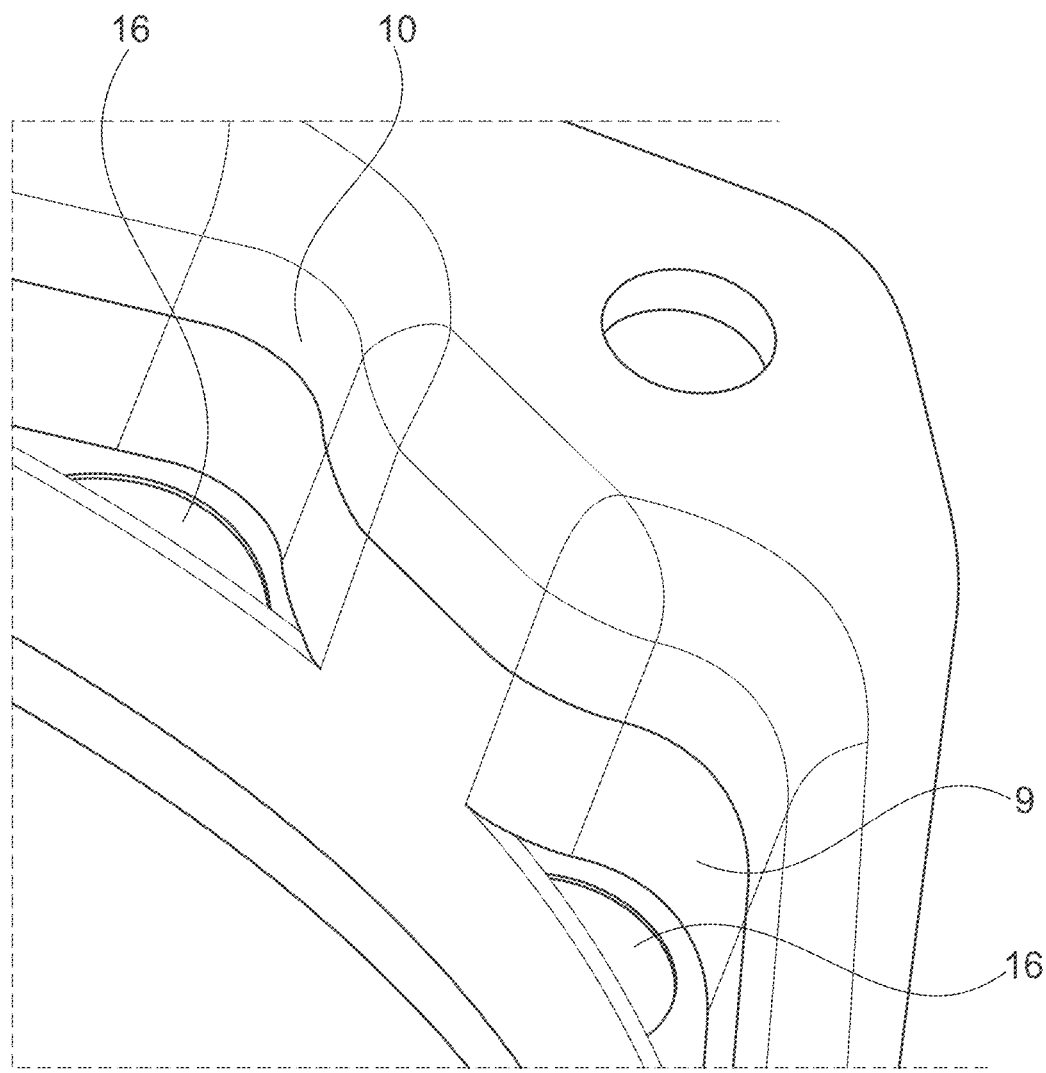
FIG. 4 shows a perspective view of the corner area of FIG. 1 without the busbar assembly.

Depending on how deeply the bearing surfaces 16 are stamped into the recesses, these can also ensure radial securing of the busbar assembly. The contact surfaces 16 extend away from the opening in the radial direction and are approximately semicircular in shape, as can be seen in FIG. 4. Each embossment 9, 10 has a contact surface 16.

The busbar assembly 15 has formations 18 which, as can be seen from FIG. 3, rest only on every second bearing surface 16. However, it is also conceivable to select a different number of formations 18 to rest on the support surfaces 16.

The stampings also reduce the bending stress at the screw-on points. Even with low material thickness or wall thickness, high mechanical stiffness of the motor housing can be achieved in the critical area of the screw-on points.

The engine housing is partially formed in the area of the embossments and deviates from the basic cylindrical shape. The embossments can generally form one or more plane-parallel surfaces which allow axial and radial alignment of motor components within the motor housing.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric motor, comprising:
   a deep-drawn motor housing including a bottom and an opening opposite the bottom, the opening being adjoined by a flange with at least one corner portion; wherein
   the flange includes, adjoining the opening, at least one partial formation including a bearing surface to support a component of the electric motor;
   the bearing surface is set in an axial position in the axial direction with respect to a surface defined in the bottom of the motor housing in a deep-drawing process;
   the bearing surface is set in a radial position in a radial direction with respect to the opening as a reference surface and is axially recessed into the at least one partial formation;
   the bearing surface supporting the component of the electric motor due to the component of the electric motor resting on the bearing surface; and
   the bearing surface is offset to one side of the at least one corner portion of the flange in a circumferential direction.

2. The electric motor according to claim 1, wherein the at least one partial formation is made of a stamped material.

3. The electric motor according to claim 1, wherein the bearing surface is made of an embossed material.

4. The electric motor according to claim 1, wherein a surface in the bottom of the motor housing is a bearing support surface of a rotor bearing.

5. The electric motor according to claim 1, wherein the component of the electric motor is a busbar assembly.

6. The electric motor according to claim 1, wherein the flange is polygonal or substantially polygonal in cross-section, the flange includes a screw-on point and two formations which each include a bearing surface and which each define a bending edge of the motor housing between the screw-on point and the opening.

7. The electric motor according to claim 6, wherein each of the two formations has a shape of a right-angled triangle in cross-section, a side opposite to the right angle being defined by the opening of the motor housing and two additional sides extending parallel or substantially parallel to outer sides of the flange.

8. The electric motor according to claim 7, wherein a rectangular or substantially rectangular envelope of the two formations of the flange enclose the screw-on point, and the screw-on point is located in a radially outermost corner of the envelope.

9. The electric motor according to claim 6, wherein outer sides of the flange adjacent the screw-on point and sides of the formations adjacent to the screw-on point enclose with extensions an imaginary square, the screw-on point being positioned in a center of the imaginary square.

10. The electric motor according to claim 9, wherein the center of the imaginary square defines a flat area with a size corresponding to a diameter of a fastener provided to the screw-on point.

11. The electric motor according to claim 6, wherein the bearing surfaces are semicircularly or approximately semicircularly adjacent to the opening.

12. A method of machining a deep-drawn motor housing of an electric motor including a bottom and an opening opposite the bottom and adjoined by a flange, the method comprising:
    forming the flange in an axial direction in at least one region adjoining the opening to form at least one partial formation; and
    in a region of the at least one formation, forming a bearing surface, with an axial position of a bearing surface relative to a surface formed in the bottom of the motor housing in a deep-drawing process and a radial position of the bearing surface relative to the opening being calibrated during forming; wherein
    the axial position and the radial position of the bearing surface are calibrated by an embossing process during the forming the bearing process.

13. The method according to claim 12, wherein the forming of the flange and the bearing surface are each carried out by an embossing process.

14. The method according to claim 12, wherein the forming the bearing surface includes the bearing surface being stamped once in a preliminary forming process, and then being re-stamped to be calibrated with respect to the axial location of an additional surface formed during or after the preliminary forming process.

* * * * *